INVENTOR;
ROBERT E YOUNG.
BY Romeyn A. Spare
HIS ATTORNEY.

Patent 2,700,889

2,700,889

BALL INSPECTION GAUGE

Robert E. Young, Wethersfield, Conn., assignor to General Motors Corporation, Detroit, Mich., a corporation of Delaware Application March 18, 1950, Serial No. 150,387

11 Claims. (Cl. 73—37.5)

This invention relates to inspection gauges and particularly to a ball inspection device which employs fluid pressure to gauge ball contours.

Balls as used in antifriction bearings should be accurately finished to precise sphericity and should be free from even minute surface imperfections. Due to the large surface area of a ball, previous ball-gauging and ball-inspection operations have been slow and frequently incomplete. Minute surface imperfections are easily overlooked in the visual inspection of a ball, and it is not practical to explore the entire surface of a ball with a gauge point.

An object of this invention is to provide an improved ball inspection device which is quickly and easily operated to explore the surface of a ball and indicate errors in sphericity and surface imperfections.

A further object is to provide an improved ball inspection gauge responsive to fluid pressure and wherein even minute surface imperfections in a ball are quickly and easily detected.

A still further object is to provide a ball inspection gauge wherein the flow of air under pressure between a ball and a circular seat is used to indicate contour errors in a ball surface.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a perspective view of the invention;

Figure 1:
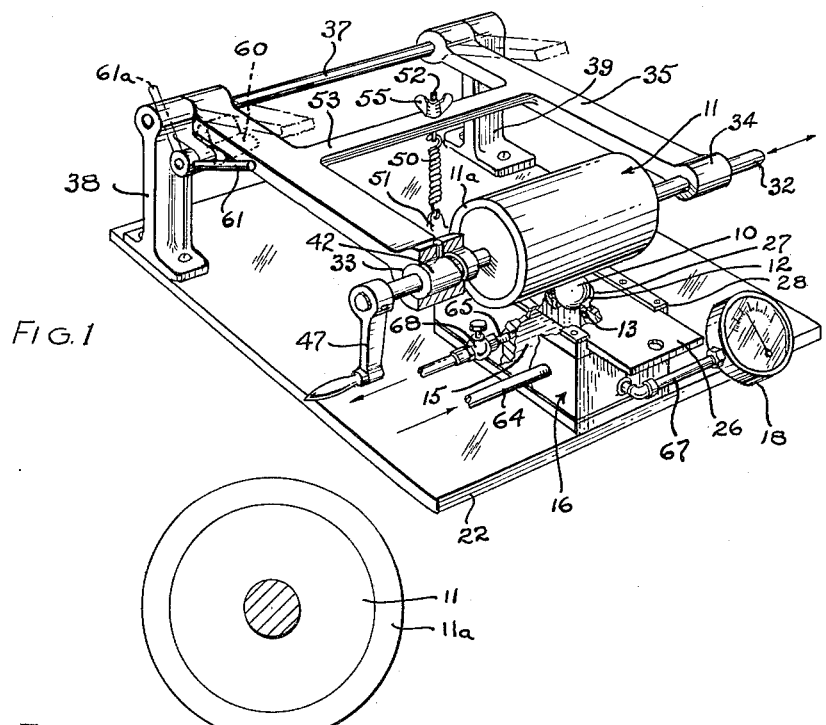
Figures 2, 4:
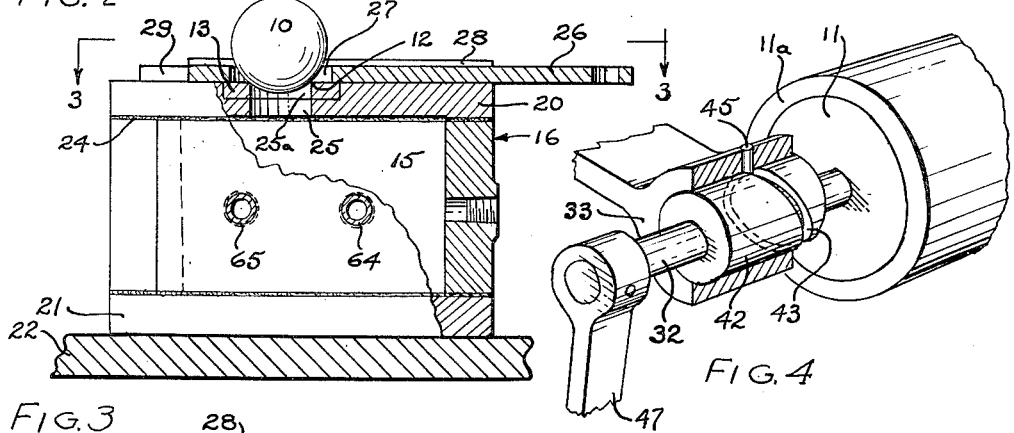
Figure 2 is a fragmentary side elevation showing a ball being gauged.
Figure 4 is a fragmentary perspective view of the roller shifting mechanism.
Figure 3:
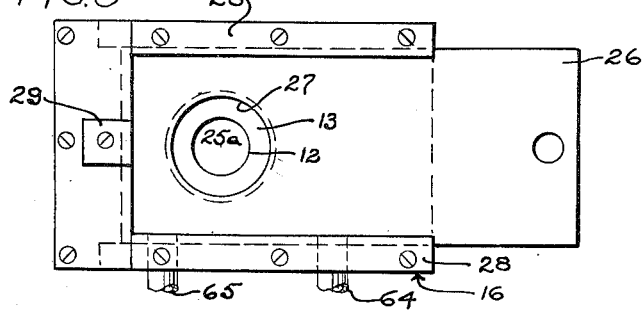
Figure 3 is a plan view along the line 3—3 of Figure 2.

Generally considered, a ball 10, to be inspected, is yieldably held by a roller 11 in seated engagement with a circular edge 12 of an annular seat member 13 having a bore communicating with a pressure chamber 15 in a box 16. Fluid, as air, under constant pressure is fed into the pressure chamber 15 which communicates with a gauge 18. The roller 11 is rotated and axially moved to rotate the ball about changing axes to sequentially bring all portions of the ball surface against the circular seat portion 12. Errors in ball surface contour will cause fluid leakage between the ball and the circular seat portion 12 with consequent indication of change in pressure in the gauge 18.

In the illustrated embodiment, the box 16 has a body portion including side and end walls to which are secured a flat top wall 20 and a flat bottom wall 21 that is fastened to a base plate 22. A gasket 24 prevents leakage between the top wall and the body and a similar gasket prevents leakage between the bottom wall and the box body. A bore 25, which vertically extends through the top wall 20 enters at its upper end into a counterbore in which is closely fitted the annular seat member 13 which preferably has its top plane face even with the upper face of the top wall 20. The seat member 13 may be composed of a suitable hard wear-resistant material and has a bore 25a preferably forming a continuation of the bore 25. The top flat face of the seat member 13 and its bore 25a are precisely finished, as by grinding and/or lapping to provide at the top of the bore 25a the very accurately formed circular edge 12 against which the balls 10 are successively seated during gauging inspections. In the present illustrations, the seat member is composed of tungsten carbide. A ball-feeding plate 26, provided with a through bore 27 for receiving a ball, is longitudinally slidable above the top wall 20 in tracks 28 and into and out of engagement with a stop block 29 to place a ball in and remove it from gauging position. When this plate 26 engages the block 29 the wall of the bore 27 surrounds the ball in spaced relation.

The roller 11 has a yieldable antifriction covering 11a, such as resilient rubber, and is secured to a shaft 32 which extends through bearings 33 and 34 in the spaced arms of a frame 35 pivotally mounted through a cross shaft 37 in supporting brackets 38 and 39 fastened to the base plate 22. A drum cam 42, fastened to the shaft 32 and journalled in the bearing 33, has a continuous repeating cam track 43 that slidably engages a pin 45 secured in the bearing 33. When the roller 11 is rotated, as by a crank 47 secured to the shaft 32, the engagement of the repeating cam with the pin 45 causes an axial movement of the roller 11 resulting in a rotation of the ball 10 about a changing axis so that all portions of the ball surface are moved past the circular edge 12. A coiled spring 50, stretched between a base projection 51 and a screw member 52 freely extending through a frame cross arm 53, is adjustably tensioned by a wing nut 55 on the screw to hold each ball being gauged under a predetermined pressure against the seat 12 during a ball gauging operation. A cam 60, closely beneath but normally out of engagement with an arm of the frame 35, is secured to a shaft journalled in a lateral projection of the bracket 38 and operated by a lever 61 fastened to the outer end of this shaft. The lever 61 may be swung upwardly and backwardly against the bracket to a position 61a causing the nose of the cam 60 to engage and lift the frame 35 and swing past a dead center position, as shown in dot and dash lines, thereby lifting and holding the roller 11 out of ball engagement when it is desired to locate a ball in or to remove it from gauging position.

A feed pipe 64 and an outlet pipe 65 are threaded in a side of the box 16 and communicate with the pressure chamber 15, and piping 67 provides communication between the pressure chamber 15 and the gauge 18. A valve 68, as a needle valve, is connected to regulate leakage from the pressure chamber 15. While a ball 10 to be gauged is held by the roller 11 against the circular seat edge 12, air or other suitable fluid is filtered and directed under a constant predetermined pressure through the pipe 64 into the chamber 15. As the crank is turned to explore the surface of the ball 10 against the circular seat edge 12, ball surface imperfections and out of roundness of the ball results in fluid leakage from the pressure chamber 15 out between the ball surface and the seat edge 12. This leakage will be indicated by the gauge 18. The needle valve 68 is preferably adjusted to provide such leakage from the pressure chamber 15 that the gauge pointer will initially locate at a predetermined high scale position when no fluid leakage occurs between a perfectly contoured ball and the seat edge 12. The extent of pointer movement from this initial position will gauge the aggregate surface contour errors of the seated portion of the ball.

I claim:

1. In a ball inspection device, a member having a pressure chamber, means directing fluid under pressure into said chamber, a seat communicating with the chamber and provided with a circular edge, said circular edge supporting a ball in substantially continuous linear contact therewith during a ball gauging operation, a slidable and rotatable ball-engaging member for turning the ball about a changing axis in slidably seated engagement with the periphery of said circular edge, and a gauge communicating with said chamber and measuring fluid leakage between the ball and said circular edge.

2. In a ball inspection device, a member having a pressure chamber, means directing fluid under pressure into said chamber, a circular seat communicating with the pressure chamber and having a circular edge demountably receiving a ball in substantially continuous circular contact therewith, a movable ball-engaging member rotating the ball while it is supported by said circular edge, and a gauge measuring fluid leakage between the ball and said seat for indicating ball contour errors.

3. In a ball inspection device, a member having a pressure chamber, means directing fluid under a predetermined constant pressure into said chamber, a circular seat communicating with the pressure chamber and having a circular edge against which a ball is peripherally and demountably supported during a gauging operation, a movable ball-engaging roller rotating the ball against the circular edge of said seat under predetermined pressure, and a gauge measuring fluid leakage between the ball and said seat to determine errors of ball contour.

4. In a ball inspection device, a box having a pressure chamber, means directing fluid under a constant predetermined pressure into said chamber, a seat member provided with a circular portion demountably supporting a ball only along a circular line, a roller engageable with the ball and holding the ball against said circular portion of the seat, driving mechanism which simultaneously rotates and axially shifts the roller, and a gauge measuring the change in pressure within the chamber resulting from fluid leakage between the ball and said circular portion of the seat.

5. In a ball inspection device, a box having a pressure chamber, means providing a flow of fluid under constant predetermined pressure into said chamber, a member having a circular seat opening into the pressure chamber and demountably supporting a ball only along a circular edge of said seat, a roller engageable with the ball, mechanism yieldably urging the roller against the ball under a predetermined pressure to hold the ball against said circular edge, means simultaneously rotating and axially shifting the roller while in ball-engagement, and a gauge measuring the fluid pressure in said chamber.

6. In a ball inspection device, a box having a pressure chamber, a pipe directing fluid under a predetermined pressure into said chamber, a member of hard wear-resistant material mounted in the box, said member having a seat communicating with the pressure chamber and demountably supporting a ball only along a circular edge of the seat, an axially movable and rotatable roller engaging the ball to rotate the ball in slidable engagement with the seat about a changing axis, adjustable mechanism yieldably urging the roller against the ball under predetermined pressure, and a gauge measuring the leakage of fluid under pressure between the ball and said circular edge of the seat.

7. In a ball inspection device, a box having a pressure chamber, a pipe directing fluid under predetermined pressure into said chamber, a wear-resistant seat member mounted in the box, the seat member having a seat opening into said chamber and demountably supporting a ball along a circular edge of the seat, an axially movable and rotatable roller having a yieldable outer face for rotatably sliding the ball against the edge of said seat about a changing axis, resilient means holding the roller in ball driving engagement, raising and lowering mechanism moving the roller into and out of ball engagement, and a gauge measuring fluid leakage between the ball and said seat.

8. In a ball inspection device, a box having a pressure chamber, a pipe directing fluid under constant predetermined pressure into the pressure chamber, a seat member in said box and having a circular wear-resistant seat demountably receiving a ball along a circular edge of the seat, an axially movable and rotatable roller having a covering anti-frictionally engaging the ball for rotating the ball against said circular edge and about a changing axis, adjustable mechanism yieldably urging the roller against the ball under predetermined pressures, mechanism to raise the roller from and to lower the roller into ball engagement, and a gauge measuring the pressure in said pressure chamber.

9. In a ball inspection device, a box having a pressure chamber, a pipe directing fluid under predetermined pressure into the chamber, a wear-resistant seat member mounted in the box, the seat member having a circular seat opening into said chamber and demountably supporting a ball along a circular edge of the seat, an axially movable and rotatable roller engaging and rotating the ball against the circular edge of said seat about a changing axis, adjustable means urging the roller against the ball under a predetermined but adjustable pressure, a gauge measuring the fluid pressure in said chamber, and a valve communicating with said chamber and regulating the maximum fluid pressure in said chamber.

10. In a ball inspection device, a box having a pressure chamber, a pipe directing fluid under predetermined pressure into the chamber, a wear-resistant seat member mounted in the box, the seat member having a circular seat opening into said chamber and demountably supporting a ball only along a circular edge of the seat, feeding mechanism for placing a ball in and for removing it from said seat, a roller having a yieldable outer face engageable with the seated ball, means to rotate and axially shift the roller for rotating the ball in its seat about a changing axis, yieldable mechanism urging the roller into ball engagement under predetermined but adjustable pressure, a gauge measuring the fluid pressure in said chamber, and a valve communicating with said chamber and regulating the maximum fluid pressure in said chamber.

11. In a ball inspection device, a box having a pressure chamber, a pipe directing air under a predetermined pressure into said chamber, a wear-resistant seat member mounted in the box, the seat member having a circular seat opening into the chamber and demountably supporting a ball only along a circular edge of the seat, feeding mechanism for locating a ball in and for removing it from the seat, a roller having a yieldable outer face engageable with the seated ball, mechanism axially shifting and rotating said roller, adjustable means holding the roller under predetermined pressure against the ball, a gauge measuring the air pressure in said pressure chamber, a valve adjustably controlling air leakage from said chamber, and roller raising and lowering mechanism to move the roller into and out of ball engagement.

References Cited in the file of this patent

UNITED STATES PATENTS

| | | |
|---|---|---|
| 1,901,966 | Hoffman et al. | Mar. 21, 1933 |
| 2,278,800 | Rodanet | Apr. 7, 1942 |
| 2,360,058 | Hohwart | Oct. 10, 1944 |
| 2,621,511 | Van Dorn | Dec. 16, 1952 |